(12) United States Patent
Galluzzo et al.

(10) Patent No.: US 10,147,069 B2
(45) Date of Patent: Dec. 4, 2018

(54) SYSTEM AND METHOD FOR PIECE PICKING OR PUT-AWAY WITH A MOBILE MANIPULATION ROBOT

(71) Applicants: Thomas Galluzzo, Gibsonia, PA (US); Vladimir Altman, Pittsburgh, PA (US); Jean-Sebastian Valois, Pittsburgh, PA (US)

(72) Inventors: Thomas Galluzzo, Gibsonia, PA (US); Vladimir Altman, Pittsburgh, PA (US); Jean-Sebastian Valois, Pittsburgh, PA (US)

(73) Assignee: IAM Robotics, LLC, Pittsburgh, PA (US)

(*) Notice: Subject to any disclaimer, the term of this patent is extended or adjusted under 35 U.S.C. 154(b) by 0 days.

(21) Appl. No.: 15/947,921

(22) Filed: Apr. 9, 2018

(65) Prior Publication Data

US 2018/0293536 A1    Oct. 11, 2018

Related U.S. Application Data

(63) Continuation of application No. 15/728,080, filed on Oct. 9, 2017, now Pat. No. 9,940,604, which is a (Continued)

(51) Int. Cl.
*G06Q 10/08* (2012.01)
*B25J 9/16* (2006.01)
(Continued)

(52) U.S. Cl.
CPC ............ *G06Q 10/087* (2013.01); *B25J 5/007* (2013.01); *B25J 9/0093* (2013.01); *B25J 9/162* (2013.01);
(Continued)

(58) Field of Classification Search
None
See application file for complete search history.

(56) References Cited

U.S. PATENT DOCUMENTS

| 5,413,454 A | * | 5/1995 | Movsesian ............... B25J 5/007 294/100 |
| 2012/0321423 A1 | * | 12/2012 | MacKnight ....... H01L 21/67276 414/664 |

(Continued)

*Primary Examiner* — Kyle O Logan
(74) *Attorney, Agent, or Firm* — Cohen & Grigsby, P.C.

(57) ABSTRACT

A method and system for piece-picking or piece put-away within a logistics facility. The system includes a central server and at least one mobile manipulation robot. The central server is configured to communicate with the robots to send and receive piece-picking data which includes a unique identification for each piece to be picked, a location within the logistics facility of the pieces to be picked, and a route for the robot to take within the logistics facility. The robots can then autonomously navigate and position themselves within the logistics facility by recognition of landmarks by at least one of a plurality of sensors. The sensors also provide signals related to detection, identification, and location of a piece to be picked or put-away, and processors on the robots analyze the sensor information to generate movements of a unique articulated arm and end effector on the robot to pick or put-away the piece.

20 Claims, 5 Drawing Sheets

Related U.S. Application Data continuation of application No. 14/340,896, filed on Jul. 25, 2014, now Pat. No. 9,785,911.

(60) Provisional application No. 61/858,590, filed on Jul. 25, 2013.

(51) Int. Cl.
  *B25J 15/06* (2006.01)
  *B25J 19/02* (2006.01)
  *B65G 1/137* (2006.01)
  *G05D 1/02* (2006.01)
  *B25J 5/00* (2006.01)
  *B25J 9/00* (2006.01)
  *B25J 11/00* (2006.01)
  *B25J 15/00* (2006.01)
  *B60P 1/54* (2006.01)
  *G05D 1/00* (2006.01)

(52) U.S. Cl.
  CPC ............ *B25J 9/1692* (2013.01); *B25J 11/00* (2013.01); *B25J 15/0028* (2013.01); *B25J 15/0085* (2013.01); *B25J 15/06* (2013.01); *B25J 15/0608* (2013.01); *B25J 15/0616* (2013.01); *B25J 19/021* (2013.01); *B60P 1/5423* (2013.01); *B65G 1/1373* (2013.01); *B65G 1/1375* (2013.01); *G05D 1/0011* (2013.01); *G05D 1/0088* (2013.01); *G05D 1/0248* (2013.01); *B65G 2209/04* (2013.01); *G05B 2219/37008* (2013.01); *G05B 2219/39441* (2013.01); *G05B 2219/40298* (2013.01); *G05B 2219/40543* (2013.01); *G05B 2219/40564* (2013.01); *G05B 2219/45063* (2013.01); *G05D 2201/0216* (2013.01); *Y10S 901/01* (2013.01); *Y10S 901/02* (2013.01); *Y10S 901/31* (2013.01); *Y10S 901/40* (2013.01); *Y10S 901/47* (2013.01)

(56) References Cited

U.S. PATENT DOCUMENTS

| | | | |
|---|---|---|---|
| 2012/0328395 A1* | 12/2012 | Jacobsen | B25J 3/04 414/1 |
| 2013/0317642 A1* | 11/2013 | Asaria | G06Q 10/08 700/216 |
| 2014/0277691 A1* | 9/2014 | Jacobus | G06Q 10/087 700/216 |

* cited by examiner

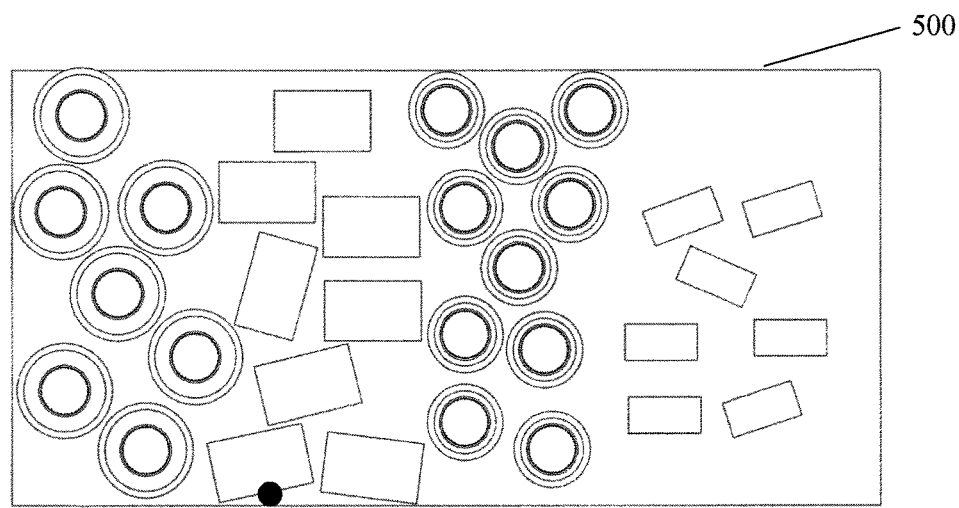
FIG. 5A
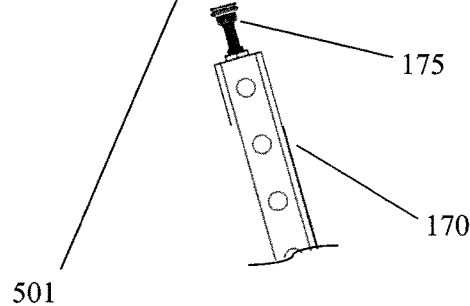
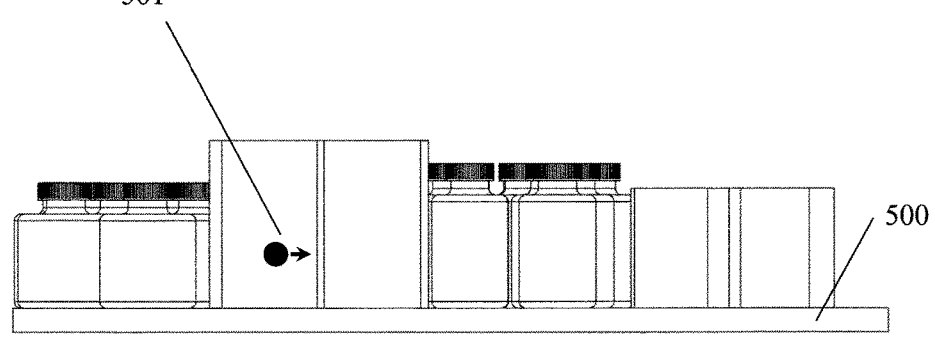
FIG. 5B

SYSTEM AND METHOD FOR PIECE PICKING OR PUT-AWAY WITH A MOBILE MANIPULATION ROBOT

RELATED APPLICATIONS

This application is a continuation of U.S. patent application Ser. No. 15/728,080, filed on Oct. 9, 2017, now U.S. Pat. No. 9,904,604, which is a continuation of U.S. patent application Ser. No. 14/340,896, filed on Jul. 25, 2014, now U.S. Pat. No. 9,785,911, which claims the benefit of prior U.S. Provisional Patent Application Ser. No. 61/858,590, filed on Jul. 25, 2013, the entire contents of which are hereby incorporated by reference.

TECHNICAL FIELD

This invention relates generally to supply chain, manufacturing and logistics automation equipment systems. More specifically, the present invention is directed to systems, devices and methods useful for the purpose of automatically picking items from, and replacing items to, a storage location that uses common infrastructure such as racks or shelves.

BACKGROUND

In logistics facilities, such as distribution centers or retail stores, goods are stored for retrieval by a pick worker or customer. Each type of item is known as a Stock Keeping Unit (SKU), and each SKU has a specific location in which it is kept. These items can be stored openly on shelving racks, or in compartmentalized containers, such as boxes or bins.

In a wholesale center, items are often stored in sealed cases, where individual units are packed together in a shipping case, as when they are received from a manufacturer. Cases may further be grouped together and stored on pallets, which is common for freight shipments of goods.

When goods need to be retrieved individually for order fulfillment or selection by a customer, they are typically stored individually and are not grouped into cases or pallets. The process of breaking the cases or pallets for individual product picking, that is, taking the individual pieces from the case or pallet and placing them in a specific storage location in a facility, is called put-away. The process of picking or selecting individual items from a specific storage location in a facility is known as piece picking or each-picking. Put-away and piece picking happens in both distribution warehouses and retail centers, whereas case-picking or pallet-picking typically only happens at a wholesale distribution center.

A fundamental problem with piece picking, and to a lesser extent put-away, is that it is inherently time consuming; it requires a significant portion of time to be spent traveling from one item storage location to another. For put-away a person manually brings product cases to the pick locations and breaks them open to facilitate piece picking. For piece picking of a product there is the added time it takes to find and identify the specific item of interest in its unique storage location. This is often accomplished by specific SKU numbers that positively identify the item to be picked. While different SKUs may appear to be the same, there may have some internal variations, such as weight, which cannot be identified outwardly. Finally, a person must manually pick or grasp the item and transfer it into a transport container, such as a cardboard box or plastic tote for shipping.

Due to the time consuming nature of piece picking it is a very costly manual process, and therefore has received much attention by organizations looking to save time and money. There are many solutions for both optimizing and automating various aspects of piece picking. Some techniques look to minimize the amount of travel time required to move from one point to another by reorganizing the SKU locations such that the most frequently accessed items are grouped together or require a minimum amount of reach by a worker grasping the item.

Automation solutions range from augmenting manual labor with various technologies to completely replacing labor with customized picking equipment and infrastructure. For example, some automation systems support manual workers with barcode or radio frequency identification (RFID) scanners that enable them to more rapidly locate and identify a product. Others, such as voice picking technology, provide the piece picker with an audio and speech interface headset that communicates to the worker which items to pick and their location thereby enabling a hands-free process that improves speed and productivity.

There are also many types of automated machines that enable more efficient picking operations. For example, large scale goods-to-person Automated Storage and Retrieval Systems (AS/RS) allow a pick worker to remain in a fixed location. These systems have movable SKU storage bins that can be carried by a machine to and from a fixed storage location and delivered to a worker for picking individual pieces out of the bins. There are also Automated Guided Vehicle (AGV) systems that can transfer storage racks to and from a pick area where a worker can locate and grab the requested item.

The automation equipment technologies presently available for picking operations require a substantial modification of infrastructure for the logistics center in which they are used. This requires a significant up-front investment from the facility, which is difficult to afford and is the main reason such solutions have not been widely adopted. As such, many distribution facilities still rely on manual labor to accomplish piece picking. Further, current automation systems are not viable for retail centers because the infrastructure must also be accessible to the customer. That is, current automation equipment cannot be used within a retail facility which relies on simple static shelving for product storage and display.

Currently, logistics facilities follow a standard process for put-away and picking of goods. Items arrive into the facility at a receiving area, typically in cases or pallets, and are commonly registered into an Inventory Management System (IMS) or Warehouse Management System (WMS). A WMS is a software database which stores information about SKUs which may include the product size, weight, inventory count, storage location, etc. After the items are received, they are put-away into their storage locations, typically open shelving or racks. This is usually a manual process which involves a stock worker physically moving the items to a location and transferring the items onto the shelf or rack.

Picking is done by a manual pick worker, also called selector or picker, in a warehouse, or by a customer in a retail facility. In a warehouse, picking happens after an order is received from an external customer. The orders are typically registered with the WMS, which then creates a work order, commonly known as a pick list, which instructs the picker which items must be retrieved, their quantities, and location within the facility. The picker then must find the items and physically transfer them to a shipping container that is associated with the order.

The two primary objections to automation for picking using currently known systems are: first, that the perceived upfront cost is too high, and second, that automation equipment is not flexible enough to accommodate changes to inventory or the operation process. As such, the majority of businesses have continued to rely on manual picking labor. The high cost and inflexibility of current automation is largely due to the infrastructure changes required for such solutions. Therefore, a solution that does not require changing significant infrastructure in a facility, such as using existing shelving and racks, and works side-by-side with manual labor is desired. Such a solution would reduce upfront cost and keep the flexibility of human workers available.

SUMMARY

The presently disclosed invention overcomes many of the shortcomings of the prior art by providing systems, devices and methods for robotic piece picking or put-away directly from existing stock item locations in a logistics facility. The presently disclosed invention provides a mobile robotic system that includes sensors and manipulator arm(s) to perceive, localize, reach, grasp and transfer SKUs from a storage rack to a transport container for piece picking, or conversely, from a transport container to a storage rack for put-away. This system and method allows existing facility infrastructure to remain intact and further allows the facility to use both manual picking and robotic picking interchangeably.

The presently disclosed robotic system and method solves several aspects of robotic piece picking or put-away which are challenging and remain unsolved in the prior art. Specifically, the system enables robotic picking to be done rapidly using a high degree-of-freedom manipulator arm on a mobile base that can autonomously navigate and position itself within an existing facility. The method and unique system design enable perception, localization and grasping of SKUs in a sufficiently fast manner that is essential for operational viability and economy. It also reduces the complexity and cost required for autonomous navigation of the mobile base.

According to its major aspects, and briefly stated, the presently disclosed invention includes a system for piece picking or put-away within a logistics facility comprising a central server and at least one mobile manipulation robot. The logistics facility may be a warehouse, distribution center, manufacturing facility, or retail facility. The central server comprises a server communication interface, one or more server processors, and a server memory. Each of the mobile manipulation robots comprise a mobile base, at least one articulated manipulator arm having an end effector, at least one piece containment area, a plurality of sensors, a remote communication interface, a robot memory configured to store robot specific information, and one or more robot processors coupled to the sensors, the robot memory, the mobile base, and the at least one articulated manipulator arm.

The robot specific information may include at least calibration data for the plurality of sensors. The robot memory may comprise computer program instructions executable by the one or more robot processors to receive data from and send data to the central server, process data received from each of the sensors, and output control signals to the mobile base and the at least one articulated manipulator arm.

Further, the plurality of sensors provide signals related to detection, identification, and location of the piece to be picked, and the one or more robot processors analyze the sensor information to generate articulated arm control signals to guide the end effector of the at least one articulated manipulator arm to pick the piece. The sensors may also provide signals related to a unique identification for the piece to be picked, an obstacle detected in the path of the at least one mobile manipulation robot, and a current location within the logistics facility of the at least one mobile manipulation robot.

In certain embodiments of the system, the server memory may comprise computer program instructions executable by the one or more server processors to receive data from a warehouse management system and dispatch the at least one mobile manipulation robot. The server communication interface may connect with the remote communication interface to send and receive piece picking data which may include a unique identification for each piece to be picked, a location within the logistics facility of the pieces to be picked, and a route for the at least one mobile manipulation robot to take within the logistics facility. The unique identification for the piece to be picked may comprise a shape of the piece, a size of the piece, a weight of the piece, a color of the piece, a property of the construction material of the piece, such as roughness, porosity, and deformability, a visual marking on the piece, a barcode on the piece, or any combination thereof. Further, the connection between the server communication interface and the robot communication interface may be via one or more wired or wireless networks, or a combination thereof.

In embodiments of the system, the at least one mobile manipulation robot may be able to autonomously navigate and position itself within the logistics facility by recognition of at least one landmark by at least one of the plurality of sensors. The landmark may be a vertically mounted marker placed at a specific location within the logistics facility, or may be other identifiable visual or audible landmarks within the logistics facility. The sensors may be any 3D device capable of sensing the local environment such as, for example, 3D depth cameras, color cameras, grey scale cameras, laser ranging devices, sonar devices, radar devices, or combinations thereof.

In embodiments of the system, the at least one piece containment area may be configured to sense a weight for a piece placed therein. The at least one piece containment area may be at least one of a platform, a pick-to-kit holder, a container holder, or any combination thereof. Further, more than one piece may be placed on the at least one piece containment area by the articulated manipulator arm.

Certain embodiments of the system may further comprise a conveyance device configured to accept pieces from the at least one mobile manipulation robot. The conveyance device may be a conveyor belt which transfers the accepted pieces from a transfer area to a receiving area, wherein the receiving area is a packing area, a shipping area, a holding area, or any combination thereof.

In certain embodiments of the system, the at least one mobile manipulation robot may further comprise a user interface having a graphical display monitor and an input device. The input device may be a touch screen, voice command interface, facial tracking interface, small liquid crystal display (LCD) interface, track ball, or keyboard. Further, the user interface may display user information such as direction indicators showing the intended direction of movement of the robot, and error information. In embodiments, the mobile manipulation robot may also include at least one safety light, an alarm buzzer, and at least one emergency stop button reachable by nearby workers.

In certain embodiments of the system, the at least one articulated manipulator arm may have a first end portion pivotally carried by the wheeled mobile base of the robot and a second end portion comprising the end effector. Further, the first end portion of the at least one articulated manipulator arm may be mounted on a vertical actuator stage configured to raise or lower the at least one articulated manipulator arm. The end effector may be a gripper, a suction cup, an electroadhesion end effector, a magnetic end effector, or combinations thereof, and the robots may comprise an end effector swap mechanism configured to permit a change of the end effector. When the end effector is a suction cup, such may be connected to a vacuum pump through a valve, wherein actuation of the valve may be controlled by the one or more robot processors.

In certain embodiments of the system, the at least one articulated manipulator arm may further comprise an extension tool positioned at or near the second end portion. The extension tool may be sized so that it can fit into a shelf without the risk of obstructing the view of the sensors and/or interfering with non-picked items on the shelf. In certain embodiments, the extension tool may be long enough to reach into the back of a shelf to allow the end effector to pick an item placed therein, and may have a diameter that is smaller than the diameter of the end effector.

In certain other embodiments of the system, at least one sensor may be positioned at a central point on the at least one articulated manipulator arm such that rotation of the at least one articulated manipulator arm directs the at least one sensor to view the at least one piece containment area. The at least one piece containment area may comprise a calibration target which allows calibration of the at least one sensor located at the central point on the at least one articulated manipulator arm.

In certain embodiments of the system, the at least one mobile manipulation robot may further comprise batteries and/or a charging port for connection to a charging station. Such charging may be accomplished manually by a wired connection to warehouse power, or automatically via a charging port or station.

The presently disclosed invention also includes a method of piece picking or put-away within a logistics facility. The method may use a system for piece picking or put-away which includes a central server and at least one mobile manipulation robot as defined in any of the embodiments described above, and may include the steps of:

receiving at a central memory via a server communication interface at least one piece picking order including at least one item to be picked;

generating at the one or more server processors a piece picking itinerary based on the at least one piece picking order, wherein the itinerary includes a unique identification for each item to be picked, a location within a logistics facility of the items to be picked, and a route for the at least one mobile manipulation robot to take within the logistics facility;

receiving at a robot memory the piece picking itinerary;

moving the at least one mobile manipulation robot along the route to the location within the logistics facility of the items to be picked;

picking the at least one item to be picked from the location using an end effector of at least one manipulator arm; and placing the at least one item to be picked in the at least one piece containment area.

In certain embodiments of the method, the plurality of sensors may provide signals related to detection, identification, and location of the at least one item to be picked, and one or more robot processors may analyze the sensor information to generate articulated arm control signals which guide the end effector to pick the item. Furthermore, these sensors may allow the at least one mobile manipulation robot to move through a logistics facility autonomously by recognition of at least one landmark.

In embodiments of the method, the at least one piece picking order received at the central memory may be generated by a warehouse management system. In other embodiments, a piece picking order may be generated by a human user at a user interface which is attached to the robot and which communicates with the one or more robot processors and a robot memory. In such an embodiment, the piece picking itinerary may be generated by the one or more robot processors, or may be generated by the one or more server processors after the piece picking order has been sent to the central memory via communication between a robot communication interface and the server communication interface.

In certain other embodiments of the method, at least one sensor may be positioned at a central point on the at least one articulated manipulator arm such that rotation of the at least one articulated manipulator arm directs the at least one sensor to view the at least one piece containment area. The at least one piece containment area may comprise a calibration target which allows calibration of this at least one centrally located sensor.

Furthermore, the method may improve pick accuracy over the prior art by sensing a weight for the at least one item placed in the at least one piece containment area.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized and other changes may be made without departing from the spirit or scope of the subject matter presented herein.

FIG. 5A and FIG. 5B are the top and front views of an exemplary pick location with example pieces, grasp positions and vectors in accordance with certain aspects of the presently disclosed invention.

DETAILED DESCRIPTION

Figure 1:
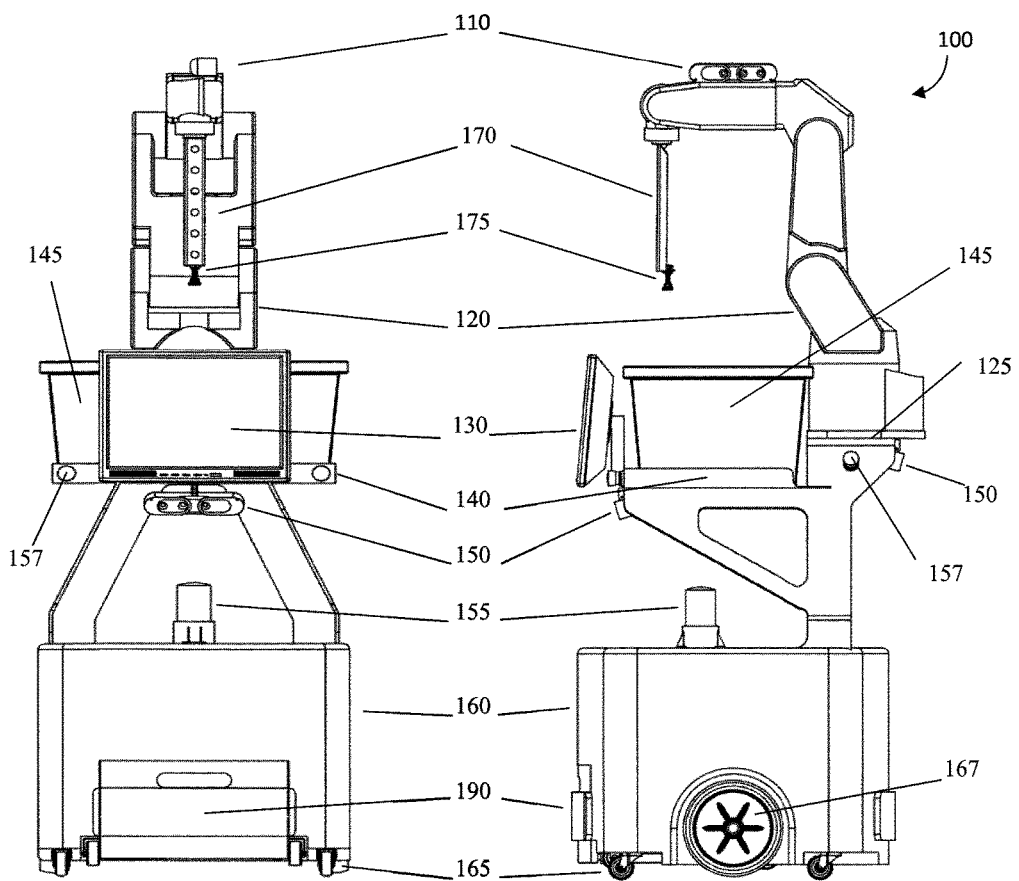
FIG. 1A and FIG. 1B are the front and side views, respectively, of an exemplary embodiment representing a mobile manipulation robot in accordance with certain aspects of the presently disclosed invention.

In the following description, the present invention is set forth in the context of various alternative embodiments and implementations involving a system and method for automated robotic piece picking or put-away within a logistics facility, where the logistics facility may be, but is not limited to: a warehouse, a distribution center, a manufacturing facility or a retail facility. The presently disclosed invention utilizes both robotics hardware and software technologies that are detailed in the following description.

The above summary and drawings are not intended to describe or show each illustrated embodiment or every possible implementation of the presently disclosed invention. Furthermore, various aspects of the system and method for piece picking or put-away with a mobile manipulation robot may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the system in addition to the orientation depicted in the drawings. By way of example, if aspects of the mobile manipulation robot shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

As defined herein a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least barcodes such as a Universal Product Code (UPC), International Article Number (EAN), and Global Trade Item Number (GTIN).

Figure 2:
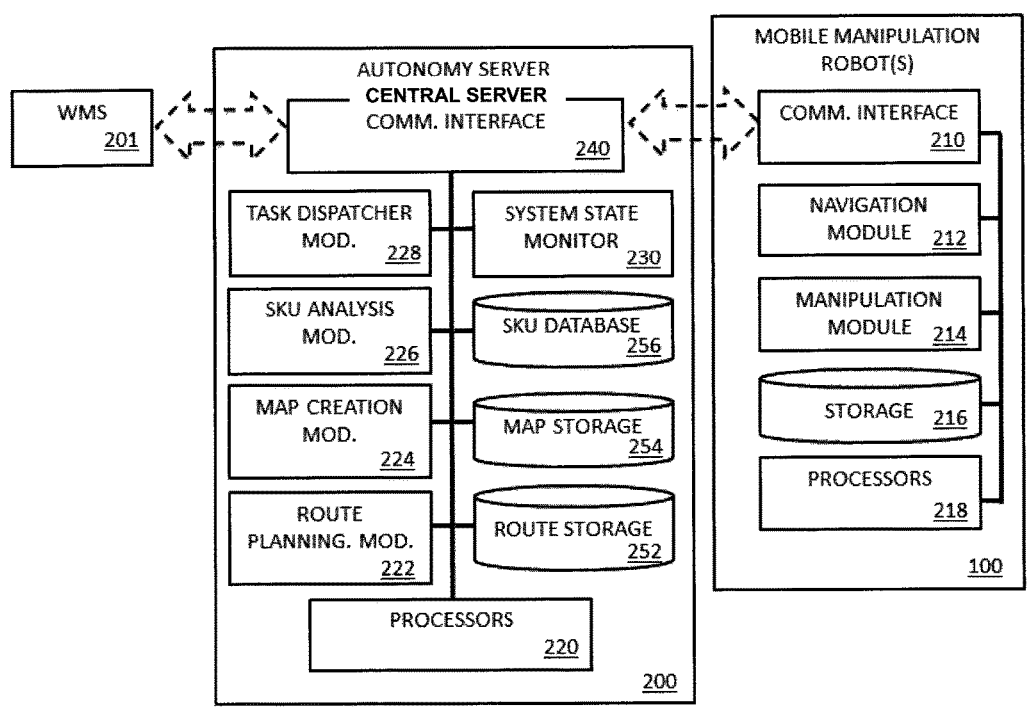
FIG. 2 is a block diagram of an exemplary embodiment representing the robotic system with the hardware and software modules of a central server and a plurality of mobile manipulation robots in accordance with certain aspects of the presently disclosed invention.

Referring now to the drawings, embodiments of the system and method for piece picking or put-away with a mobile manipulation robot are shown in FIGS. 1-5. FIGS. 1A and 1B are front and side views of an exemplary embodiment of one of a plurality of mobile manipulation robots 100 that can be used within the system. Internal details of components and software relevant to the system are shown in FIG. 2, which provides a block diagram of an exemplary embodiment of the system comprising a central server 200 and a plurality of mobile manipulation robots 100. The server may have an electronic communications interface (server communication interface 240) that connects with an electronics communication interface on the manipulation robot(s) (remote communication interface 210). This connection may be established through a wireless network via a wireless access point in a preferred embodiment. Other embodiments may include or instead use a different type of communication, such as a tethered wire connection or other point-to-point wireless data exchange.

As shown in FIGS. 1A, 1B and 2, in certain embodiments the individual manipulation robots 100 may have a wheeled mobile base 160, internal batteries 190, and an onboard computer processor 218 with memory storage 216. The robots may also have at least one temporary storage bed 140 for picked items and at least one robotic manipulator arm 120. The onboard computer processor 218 may be configured to run a set of programs with algorithms capable of performing navigation and picking. Further, the onboard computer processor 218 utilizes data from sensors (150, 110), to output control signals to the mobile base 160 and manipulator arm 120 for navigation and picking, respectively.

As mentioned above, the onboard computer processor 218 may also have local persistent memory storage 216 which stores specific information relevant to the configuration of each manipulation robot 100. Such information may include sensor calibration data, actuator tuning parameters, and other platform specific data. The onboard computer processor 218 may also communicate with the central server 200 to receive pick order information and respond back with confirmation data to inform the central server 200 of successful picks or any errors that might occur.

Each manipulation robot 100 may also have a user interface 130, which includes a graphical display monitor and an input device, where the input device may be a touch screen 130, a track ball, voice command, a keyboard, input buttons or any combination of these devices and possibly others. The user interface 130 allows a user to command and control each manipulation robot 100 to perform localized tasks and to enter product picking dispatch information manually, thus sending the robot on its mission. In addition, in one embodiment, each manipulation robot 100 may contain an external swappable memory port on a side, where necessary information may be uploaded to the robot directly when the operator inserts a data storage device, thus by-passing the wireless communication to the server. The data storage device may be a disk, USB flash device, or other forms of external memory storage devices. In other embodiments, the data is transferred through proximity communication technologies, such as near field communication (NFC), Bluetooth, or short-range radio-frequency identification (RFID) standards.

Each manipulation robot 100 may also be equipped with safety features which may include: one or more safety lights or strobes 155, an audible warning annunciator or horn, one or more emergency stop buttons 157, the ability to display fault, error and/or intended action (such as navigation turn signal) information on the user interface 130 or at some other point on the manipulation robot 100, or any combination thereof.

Furthermore, each manipulation robot 100 may be configured to receive signals from the central server 200, or directly from the WMS 201, which may indicate an emergency and may direct the robot 100 to stop and/or may further activate the one or more safety lights or strobes 155 and/or audible warning annunciator or horn. In the event that an unstable and/or unsafe diagnostic state for the manipulation robot 100 is detected by the one or more robot processors 218, the robot 100 may be stopped. The manipulation robot 100 may also be stopped if the sensors (150, 110) detect a human or obstacle in close proximity, or detect unsafe operation of the robot 100. Such signals may be processes at the central server 200 which may then control the robot speed and or direction of operation.

An articulated robot manipulator arm 120 is used in the presently disclosed system to pick pieces with the common variability found in item size, shape, weight and placement within a logistics facility. An exemplary representative drawing of such variability is shown in FIGS. 5A and 5B, which are the top and front views, respectively, of a stocked shelf 500. Common logistics storage infrastructure, such as an ordinary shelf or rack 500, does not constrain any item location and orientation for the purposes of any deliberate accuracy, therefore, in order for a robot to do a pick at random it must have sufficient freedom to grasp an item in various configurations. As such, a high degree-of-freedom robot manipulator arm 120 provides the manipulability necessary to pick an item in any configuration in which it is found.

The manipulation robot 100 may physically adjust for variations in item location and orientation which may be determined from sensor 110 information prior to the pick. In a preferred embodiment, the manipulator arm 120 may be mounted to the robot frame 125 at a position on top of the mobile base 160 of the manipulation robot 100. The manipulator arm 120 enables the robot to reach multiple shelf level heights. Some embodiments may extend the vertical reach of a robot by mounting the manipulator arm 120 on a vertical actuator stage. The vertical actuator stage would be able to raise and lower the manipulator arm 120 so an end effector 175 can reach both higher and lower pick locations. In different embodiments of the system, additional high degree-of-freedom robot manipulator arms 120 may be included which may provide additional lift capability to pick objects of various shapes and sizes when the arms work cooperatively, or to pick more than one object at a given pick location using arms working in parallel but independently. For multi-arm embodiments, the arms may be the same or have different kinematic configurations, and may have the same or different end effectors.

The present robot system uses a grasping end effector 175 on the manipulator arm 120 to pick items from their stored location and transfer them to a temporary location, or vice-versa. In a preferred embodiment, the grasping end effector may be a suction cup 175, which may be connected to a vacuum pump through an onboard computer processor 218 controlled valve. The vacuum suction at the suction cup 175 may be engaged and disengaged by actuating the valve, thereby allowing the manipulation robot 100 to grasp the desired pick item on contact and then release it when necessary. The use of a suction cup 175 also allows the robot to grasp a target piece at a single point and orientation, which reduces the computation time required for the system to determine how to grasp the pick item.

In other embodiments, the end effector may be a mechanically actuated gripper such as, for example, a robotic hand having articulated digits. In yet other embodiments, the end effector may be a simple gripper, an electroadhesion end effector, a magnetic end effector, or combinations thereof, and the robots may comprise an end effector swap mechanism configured to permit a change of the end effector. Exemplary magnetic end effectors may utilize electromagnets, permanent magnets, or magnet arrays which provide opposing magnetic fields. An electroadhesive end effector may use reversible electrostatic adhesion to grip an item while it is picked and put. In embodiments which use an electroadhesive or magnetic end effector, such end effectors may be powered by an electrical power supply configured to generate an electrostatic or magnetic adhesive force that is used to releasably adhere the item to the end effector. The onboard computer processor 218 may control the power supply to activate and deactivate the electrostatic or magnetic adhesive force of the end effector.

The use of one, various interchanged, or a combination of end effector technologies is driven by the physical properties of the grasped objects as to generate a sufficient amount of lift force to carry the objects by the manipulator arm without causing damage or visible alterations.

The presently disclosed system design also includes an extension tool 170 mounted at the end of the robot manipulator arm 120, as shown in FIG. 1. This tool 170 enables the manipulation robot 100 to position the grasping end effector 175 at a sufficient depth into a storage rack so that the end effector may reach a desired item while maintaining clearance for the manipulator arm 120 itself from contacting the infrastructure. It also enables the end effector 175 to reach into shelf corners where it would otherwise not have clearance for the robot manipulator arm 120. In certain embodiments, the extension tool 170 may be sized based on specifics of the logistics facility such as, for example, shelf depth. That is, the extension tool 170 may be long enough to reach into the back of a shelf, as mentioned above, so that the end effector 175 may pick a piece placed therein. Furthermore, the extension tool 170 may have a diameter that is smaller than the diameter of the end effector 175. This may allow the extension tool 170 to reach into a shelf without obstructing the view of the end effector 175 and/or the piece to be picked, and may simplify the computation required to locate the piece as no additional sensor information may be required to locate the extension tool; information regarding the end effector 175 would be sufficient.

In certain embodiments of the system, the extension tool 170 may be a replaceable or switchable part of the robot manipulator arm 120. In this way, logistics facilities having different configurations such as, for example, deeper shelving, may be accommodated by simply switching out the extension tool 170 to one more suited for the work (e.g. a longer extension tool). Furthermore, in embodiments where the end effector 175 is mounted directly to the extension tool 170, different end effectors may require different connection mechanisms at the end of the extension tool. As such, the ability to switch out the extension tool 170 to one having a suitable connection means may improve the ease of use of the manipulation robot 100.

After pieces are picked, they may be placed into the storage bed 140 for transportation. The bed may also carry a container 145, such as a box or tote, in which the items can be placed. This method enables multiple items to be picked for a given order or batch of orders. This method frees the robot manipulator arm 120 to pick additional pieces without needing to take multiple trips to and from an order transfer area 360 (See FIG. 3). Additionally, by carrying a packing box or container or transport tote 145 onboard, the manipulation robot 100 is able to aggregate order pieces together into a single container that can be easily swapped with a different container for additional order fulfillment.

In certain embodiments, the storage bed 140 may comprise a calibration target which may be viewed by one or more sensors 110 placed at a central location on the manipulator arm 120 (see FIG. 1). These centrally located sensors 110 may be positioned to view the calibration target on the storage bed 140 when the manipulator arm is rotated. As such, information on the calibration target may be used to calibrate these sensors 110 to ensure that all parameters are within specifications, and if not, update the parameters to reflect the current configuration. The dual use of the storage bed 140—as a platform to hold picked items and as a calibration target—reduces the size profile of the presently disclosed manipulation robot and improves the accuracy of the system.

The central location of one or more sensors 110 on the manipulator arm 120 allows for improved piece picking accuracy. First, these sensors 110 will have an unobstructed and enlarged view of the items to be picked and their storage locations, which is improved over the view that is provided by sensors placed at the end of a robotic arm or on the mobile base, as is the case in many prior art systems. Furthermore, sensors mounted at the end of a robotic arm may get in the way of, or reduce the range of positions available to, an end effector. Sensors mounted on the mobile base may have their view of the items to be picked and their storage locations impeded by movement of the robotic arm.

Second, the central location of the one or more sensors 110 on the manipulator arm 120 provides improved measurement accuracy of the item to be picked. The high degree of freedom manipulator arm 120 may move and articulate at more than one point along the arm, and each movement introduces potential error to any measurements that may be made between the end effector 175 and the items to be picked by sensors positioned on the mobile base 160. Placement of the sensors 110 at a central location may reduce this error by bringing the sensors 110 closer to the items to be picked, and thus removing the error inherent in several points of articulation.

Figure 3:
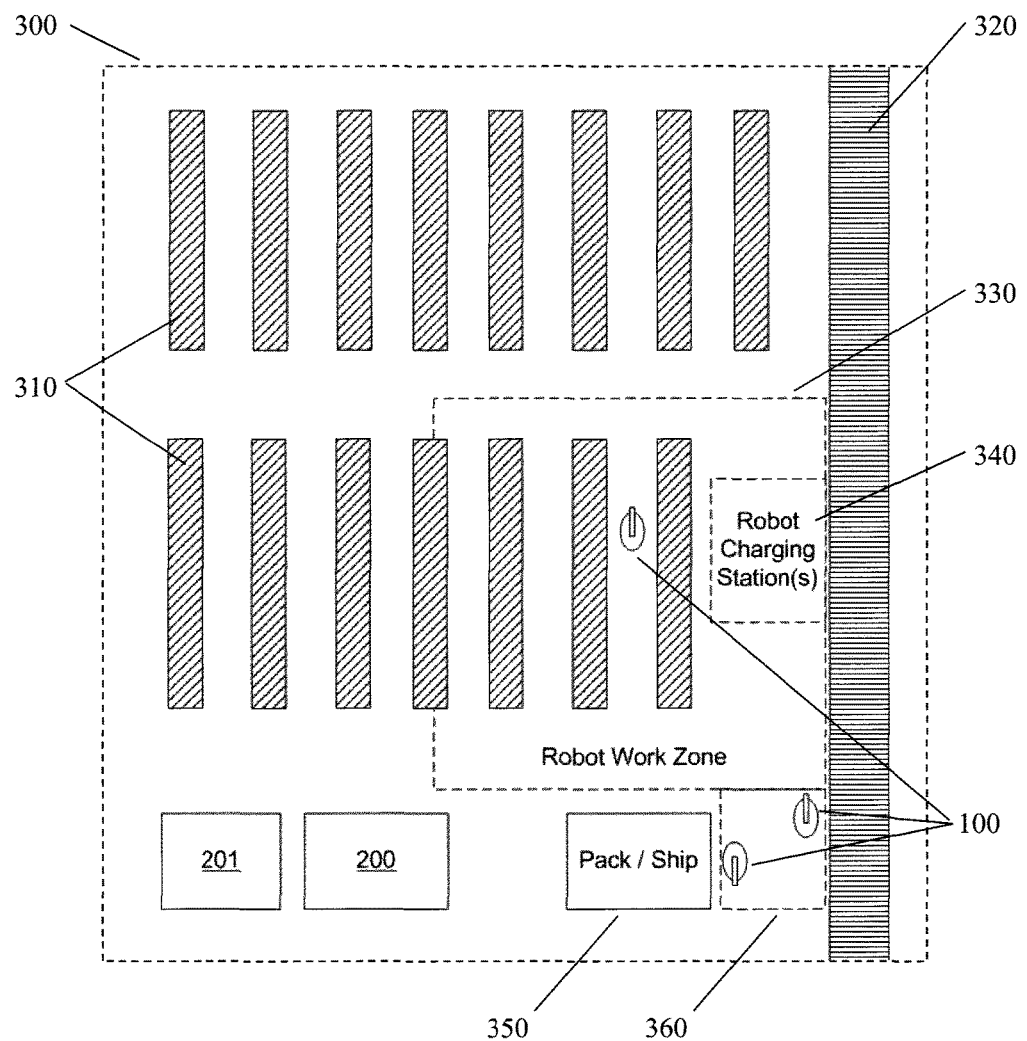
FIG. 3 is a simplified overhead floor plan diagram of a representative logistics facility.

FIG. 3 shows an exemplary top view floor plan of a section of a logistics facility 300. The presently disclosed system and method enable object pieces to be picked within a defined robot work zone 330, which stores stocked objects on common commodity shelving 310. The system and method may define a plurality of transfer areas 360 in which items would be transferred to and from the manipulator robots 100. The transfer area 360 may possibly interface with a packing and shipping station 350, or a conveyor 320 or a staging area, or any combination thereof.

At the transfer area 360, a worker may remove the picked items or container 145 holding the items from the robot 100. If a container 145 is removed, a new container 145 could be transferred to the robot 100 for fulfillment of the next order. The method may employ transfer of picked items or the container 145 by a human operator or, in other embodiments, the transfer of items may be automatic. That is, in some embodiments, the onboard robot storage bed 140 may have a mechanically actuated conveyance device that allows for automatic transfer. The conveyance device may be a small conveyor belt or may be a set of rollers or wheels, which is capable of shifting the held pieces or container 145 to and from another platform or conveyance.

In an alternative embodiment, the automatic transfer of objects from the onboard storage bed 140 may be performed by the manipulator arm 120 of the manipulation robot 100. In such an embodiment, the manipulation robot 100 may transfer individual pieces by using its end effector 175 grasping mechanism or the robot may transfer a container 145 carried in the storage bed by manipulating it with an extension tool 170 and end effector tool 175. In any of these embodiments the system may be designed to interface automatically with a separate conveyor system 320 which may be adjacent to the transfer area 360, whereby pieces or containers 145 could be automatically moved through a conveyor 360 around a facility to and from a robot picking area 330. This method has the advantage of requiring less manual work to be done to transfer objects from a manipulator robot 100 after they are picked.

The system's central server 200 may be used to process order information that is transacted with a WMS 201, and may coordinate the fulfillment of orders with a plurality of manipulation robots 100. All computation on the server 200 may be executed by one or more internal processors 220. In certain embodiments, the server may have two software modules that enable this order fulfillment coordination. The first processor may be a task dispatch module 228, which analyzes orders received from a WMS 201, and determines which of the plurality of manipulation robots 100 is to be assigned to an order. After a manipulation robot 100 is selected for picking an order, the task dispatcher 228 instructs the robot 100 with high-level order picking information, such as, route navigation paths, SKU locations, and an order drop-off location. The task dispatcher 228 works closely with a system state monitor 230 to obtain key feedback information from the system. The system state monitor 230 may communicate with the manipulation robots 100 to keep track of their current physical location within the facility, along with status information, which may include but is not limited to: whether the robot 100 is currently assigned an order, any faults or error modes, health information, such as remaining battery power, or charging status.

The central server 200 may also be used to store and process centralized SKU information in an SKU database 256, which stores information required by the robots to complete the order picking. The processing of this SKU specific information is executed within a SKU analysis software module 226. The SKU information can include SKU size and shape data, which can include physical dimensions, 3D geometry that can include point and triangle mesh structures, item weight, appearance information that can include colorized texture maps, and may include SKU marking codes, that can include barcode and UPC data. Additionally, the central server 200 may store information in the SKU database 256 about the locations and regions on the surface of the individual SKU units that are allowed, or not allowed, for grasping by the manipulation robot 100. This allows the manipulation robot 100 to grasp an item in a way that is known to be safe and stable, and prevents the robot from grasping an item at a point or in a way that is unsafe or unstable.

In certain embodiments, the onboard robot storage bed 140 may be configured to sense the weight of the piece placed thereon. This information may be communicated to the central server 200, and may provide additional verification that the correct SKU was picked, and that the item was properly transferred to the onboard robot storage bed 140. If the wrong weight is sensed in the storage bed 140, the manipulator arm 120 may be used to remove the item from the storage bed. The item may be replaced to the storage location by the manipulator arm 120, or a signal may be sent to the central server 200 requesting manual assistance, such as from a human pick worker. In the event that no weight is sensed in the storage bed 140, the manipulator arm 120 may be used to select another replacement item and/or retrieve the dropped item. Further, a signal may be sent to the central server 200 requesting manual assistance, such as from a human pick worker, or to alert the system to a change in the SKU inventory.

The central server 200 can also store information about the state of the SKU inventory in the SKU database 256, and may process this information in the SKU analysis module 226. Such information may include the position of items in their stored location, the location and orientation of grasping points for the robot to attempt to pick, and the sequence in which items of the same SKU type and approximate location should be picked from the shelf. This enables a sufficiently fast picking operation for the manipulation robot 100, such that picking geometry and sequencing can be planned and stored in memory 256 on the central server 200 or, and also, on the local storage 216 and does not need to be computed at the time of pick by a given manipulation robot 100. The central server 200 enables multiple manipulation robots 100 to share information about the state of inventory and plans for picking, so that different robots 100 can pick from the same storage location, without each one needing to sense and compute pick information.

Additionally, the central server 200 can store information about the infrastructure of the facility of operation in a map storage database 254. This can include information about the storage racks 310 such as shelving dimensions (width, depth and height), separate shelf level heights, shelf face widths, and rack column widths. The infrastructure information can be created, modified and analyzed through a map creation software module 224 on the central server 200. By using this module a human operator can manually create a facility map or may in some embodiments load the map data from a predefined file, such as a Computer Aided Drawing (CAD) file, or in other embodiments may load mapping data automatically collected by a robot 100, which can use its onboard sensors (150, 110), to observe the facility infrastructure and automatically generate a map.

The manipulation robots 100 may have a set of sensors (150, 110) that enable autonomous navigation within a facility and sensors 110 that allow it to identify and localize individual SKUs for picking. The sensors (150, 110) may be 3D depth cameras, color cameras, laser ranging devices, or any combination thereof. These sensors (150, 110) in a preferred embodiment provide high resolution 3D point data to the manipulation robot 100 that details the presence of physical objects within their field of view. The sensors (150, 110) may be connected to the onboard computer processor 218, which may process the 3D point and color data to extract information for navigation and picking. In different embodiments, a unique set of sensors mounted on the manipulation robot 100 may be used for picking and for navigation. The manipulation robot may be programmed to point the sensors in a direction that is expected for the task.

In order to perform pick work, the manipulator robots 100 may move and navigate between pick locations in the work zone 330 and an order transfer area 360. During navigation the sensor data may be processed by the onboard computer processor 218 in a navigation software module 212 to extract two modalities of information. The first modality may be local mapping information that indicates which areas around the manipulation robot 100 are traversable and which areas contain obstacles. The ground facing sensors 150 on the manipulation robot 100 are primarily used to generate this mapping information. There may be two ground facing sensors 150, a front-facing one and a rear-facing one. This unique design allows the manipulation robot 100 to navigate while driving both forwards and backwards, which in certain picking scenarios, eliminates the need for the manipulation robot 100 to turn around, thus reducing travel time and increasing picking efficiency.

Figure 4:
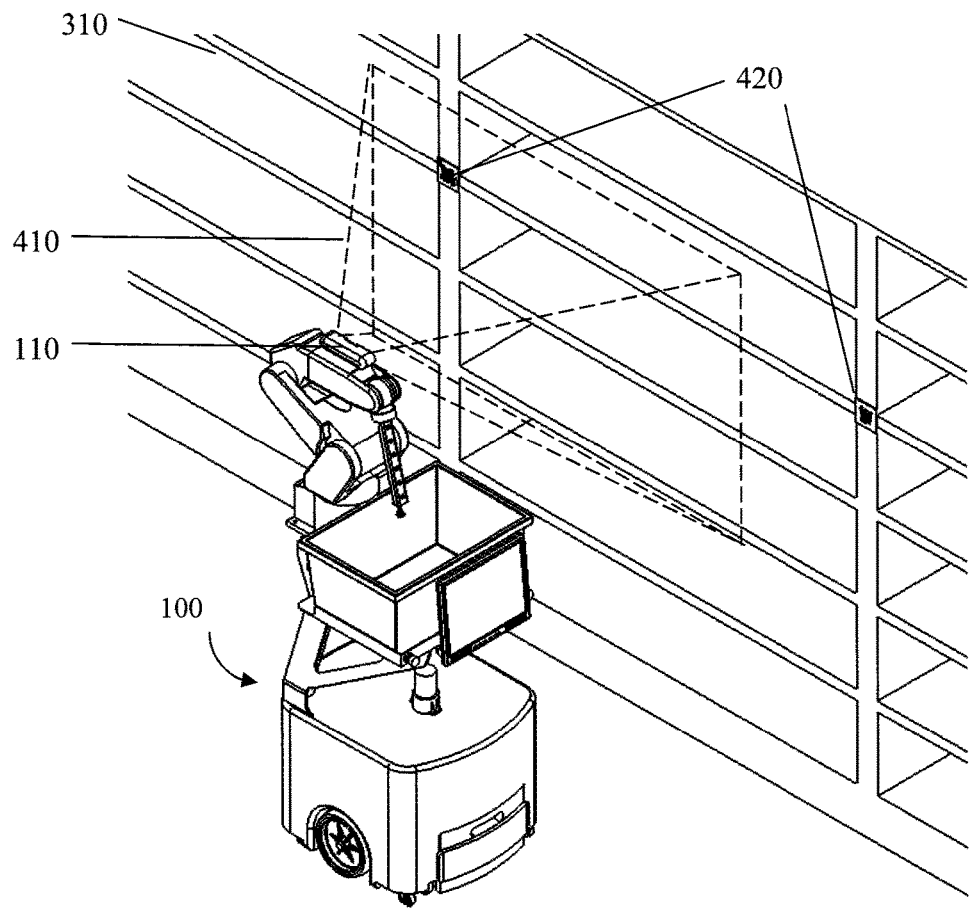
FIG. 4 is a diagram depicting an exemplary embodiment of mobile robot navigation using visual landmark location markers in accordance with certain aspects of the presently disclosed invention.

The second sensor information modality may be visual or audible landmark locations, such as the visual landmark marker 420 locations shown in FIG. 4, which presents a drawing view of a low-cost visual navigation method of the manipulation robot 100. In such an exemplary embodiment, the system may use landmarks such as visual markers 420, which may be placed ahead of time in fixed locations around the facility of operation. The onboard sensors (150, 110) are used to detect these markers 420 and locate the manipulation robot 100 relative to them. This enables the robot 100 to know precisely where it is in the facility. Each marker 420 may have a unique pattern that is different from other markers 420 within the same facility. The unique marker pattern 420 may be recognized by navigation module 212 algorithms which may be run by the onboard computer processor 218, thus allowing the manipulation robot 100 to localize itself without ambiguity.

Exemplary landmarks include visual markers as described above, which may include any identifiable unique visual pattern, such as bar codes, numbers, letters, geometric shapes, or even a specific pattern of blinking lights, and audible markers, which may include at least unique patterns of sound or even specific tones of sound. Before a robot can use landmarks for navigation, the characteristics of the landmarks may be stored on the central server 200 or on the remote storage 216 of the robot. In a preferred embodiment, the characteristics of the landmarks are stored on the remote storage 216 of the manipulation robot 100 so that the robot may navigate autonomously through a logistics facility and may not require constant communication from the central server 200.

Additionally, in the embodiment depicted in FIG. 4, careful attention is given to the placement of markers 420, which may be vertically mounted on shelving 310. This allows the robot 100 to locate vertically mounted visual markers 420, because they are within the field of view 410 of its arm mounted sensor 110. Vertically mounted markers 420 are desirable because markers installed on the floor of a facility are more difficult to maintain. Floor markers are subject to tread damage from people and machines within the facility and therefore need more frequent maintenance.

In addition to onboard sensors (150, 110) and navigation software 212, the navigation process may also be aided by the central server 200. The server 200 may have access to the central facility map storage 254, which enables it to analyze the stored maps in depth and optimize routes between pick locations. As such, the central server 200 has a set of route planning algorithms in a software module 222 that allow it to pre-compute navigation routes within the robot work zone 330, and between the work zone 330 and any transfer areas 360. These routes can be stored after computation in a route storage database 252 within the central server 200, so that they can quickly be recalled and communicated to manipulation robots 100, for rapid response during order fulfillment and for interchangeability between multiple robots 100.

To perform individual piece picks, onboard sensors (150, 110) may be used to detect and localize individual pieces along with the specific locations and orientations of the grasp points 501 on the surface of a piece. FIG. 5 presents an exemplary diagram of how the manipulation robot 100 may use its end effector 175 and extension tool 170, to grasp a piece at a specific point and orientation 501. During a pick, the sensors 110 also locate the infrastructure around the pieces such as shelving levels 500, rack columns, shelf faces and signage. This geometry information for the infrastructure is required for pick manipulation algorithms in a manipulation software module 214 to determine a pick trajectory that is collision free, such that the manipulation robot 100 is able to grasp the piece without colliding with surrounding objects.

In a preferred embodiment, special attention has been given to the placement of the picking perception sensors 110, which are mounted on the manipulator arm 120 in an orientation that allows them to see the pick location while the end effector 175 is positioned above the storage bed 140, as is shown in FIG. 1B. This method enables the system to localize additional pick pieces, grasp positions and orientations after a pick has been made and an item is being placed into the storage bed 140. This picking geometry information can be stored in memory 256, on the central server 200, or, and also, on the local storage 216 where it can be recalled later to enable sufficiently fast picks of the same SKU the next time it is required. Additionally, it is common for more than a single item of a particular SKU to be picked for an order. In this case, the perception and localization computation of additional pick items can be done at the same time the manipulator arm 120 is placing a previous pick in the storage bed 140, which may help to improve the speed and efficiency of picking multiple items which are in near proximity.

In some embodiments, an additional "fine tuning" sensor may be added to the robot near the end effector tool 175 to help accurately perform a pick grasp. After the picking sensor 110 positively identifies and localizes a pick point, there may still be some positioning error present due to uncertainty in accuracy and calibration of the sensor 110. Therefore, a tuning sensor may be mounted at the tip of the end effector tool 175 on the robot 100 to more precisely locate the position of the tool 175 relative to the desired pick location. The tuning sensor would have the desired pick location in its field of view as the robot is attempting the pick grasp. As the manipulator arm 120 moves towards the desired pick location, the tuning sensor could be used to make small adjustments that guide the tool 175 toward the desired point.

The manipulator robots 100 have a mobile base 160 that is controlled by the onboard computer processor 218. The mobile base may have two main drive wheels 167, each driven by a servo motor. Each drive wheel 167 may have an encoder that provides motion feedback, which is used to precisely control the speed of each wheel in order to achieve the desired rotation and translation velocities of the robot 100. The feedback data is also used for odometry to estimate the motion of the robot 100 relative to the facility. The odometry is responsible for guiding the robot 100 navigation at times when visual markers 420 are out of sensor (150, 110) range. The mobile base 160 may also use passive wheels, such as casters 165, for stability and weight distribution.

All systems onboard the manipulation robot 100 may be powered from onboard batteries 190, which may be housed within the mobile base 160. The batteries 190 may supply power to the robot during navigation and picking for a limited time, and may be rechargeable to maintain operation through an economically viable work period. Battery charging may occur opportunistically during times at which no orders are present for the manipulation robot 100 to pick, or charging may occur separately from the manipulation robot 100. In this later case, the batteries 190 may be swapped with separately charged batteries for continued operation of the robot 100.

For opportunistic charging, the manipulation robot 100 may have a charging station in a designated area of the facility 340 in which the robot 100 can make temporary electrical contacts which feed power into the onboard batteries 190 while the robot 100 is present. For separate charging, a battery hot-swap may be performed by using permanently installed smaller short-life (minutes) onboard batteries to maintain power while a larger modular battery 190 is replaced with a fully charged battery 190 of equivalent design. This prevents the manipulation robot 100 from needing to power down during battery swap, which saves time. Hot-swapping may be done manually by a human operator, or may be done automatically by internal mechanisms of the manipulation robot 100 and charging station being used to physically swap batteries 190 while the robot 100 coordinates the procedure.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A mobile manipulation robot comprising:
   a mobile base;
   at least one manipulator arm having a first end portion pivotally carried by the mobile base, a second end portion comprising an end effector, and an extension tool positioned at or near the second end portion and configured to provide access to a piece without interference from surrounding items or infrastructure within the logistics facility;
   a plurality of sensors;
   a remote communication interface;
   a memory configured to store robot specific information; and
   one or more robot processors coupled to the plurality of sensors, the memory, the mobile base, the remote communication interface, and the at least one manipulator arm,
   wherein the memory comprises computer program instructions executable by the one or more robot processors to process data received from each of the plurality of sensors, and output control signals to the mobile base and the at least one manipulator arm, and
   wherein the plurality of sensors provide signals related to detection, identification, and location of the piece, and the one or more robot processors analyze the sensor signals to generate manipulator arm control signals to guide the extension tool and the end effector of the at least one manipulator arm to pick or put-away the piece with a collision free path throughout a controlled motion of the at least one manipulator arm.

2. The mobile manipulation robot of claim 1, wherein the one or more robot processors are configured to receive at least one order comprising an identification for at least one piece to be picked or put-away.

3. The mobile manipulation robot of claim 2, wherein the at least one order is received from a central server or a user input device, wherein the user input device comprises a manual user interface on the mobile manipulation robot, an external swappable memory port on the mobile manipulation robot, a proximity communication device, or a combination thereof.

4. The mobile manipulation robot of claim 2, wherein the at least one order comprises a location within a logistics facility for the at least one piece to be picked or put-away, and a route for the mobile manipulation robot to take within the logistics facility to pick or put-away the piece.

5. The mobile manipulation robot of claim 2, wherein the identification for the piece comprises a shape of the piece, a size of the piece, a weight of the piece, a color of the piece, a property of construction material of the piece, a visual marking on the piece, a barcode on the piece, or any combination thereof.

6. The mobile manipulation robot of claim 1, further comprising at least one storage bed configured to sense a weight for the piece when placed therein.

7. The mobile manipulation robot of claim 1, wherein the end effector is a suction cup which is connected to a vacuum pump through a valve, wherein actuation of the valve is controlled by the one or more robot processors.

8. The mobile manipulation robot of claim 6, wherein the at least one storage bed comprises a platform, a pick-to-kit holder, a container holder, or a combination thereof.

9. The mobile manipulation robot of claim 1, wherein the mobile manipulation robot is configured to autonomously navigate and position itself within a logistics facility by recognition of at least one landmark by at least one of the plurality of sensors.

10. A mobile manipulation robot comprising:
a mobile base,
at least one manipulator arm having an end effector,
a storage bed,
a plurality of sensors, wherein at least one sensor is positioned on the at least one manipulator arm such that rotation of the at least one manipulator arm directs the at least one sensor to view the storage bed,
a remote communication interface,
a memory configured to store robot specific information, and
one or more robot processors coupled to the plurality of sensors, the memory, the mobile base, the remote communication interface, and the at least one manipulator arm,
wherein the memory comprises computer program instructions executable by the one or more robot processors to process data received from each of the plurality of sensors, and output control signals to the mobile base and the at least one manipulator arm, and
wherein the plurality of sensors provide signals related to detection, identification, and location of a piece to be picked or put-away, and the one or more robot processors analyze the sensor signals to generate manipulator arm control signals to guide the end effector of the at least one manipulator arm to pick or put-away the piece.

11. The mobile manipulation robot of claim 10, wherein the storage bed comprises a calibration target which allows calibration of the at least one sensor located on the at least one manipulator arm.

12. A mobile manipulation robot comprising:
a mobile base,
a vertical actuator stage configured to raise and lower relative to the mobile base,
at least one manipulator arm having a first end portion mounted on the vertical actuator stage and a second end portion comprising an end effector,
a plurality of sensors,
a remote communication interface,
a memory configured to store robot specific information, and
one or more robot processors coupled to the plurality of sensors, the memory, the mobile base, the remote communication interface, and the at least one manipulator arm,
wherein the memory comprises computer program instructions executable by the one or more robot processors to process data received from each of the plurality of sensors and output control signals to the mobile base and the at least one manipulator arm,
wherein the plurality of sensors provide signals related to detection, identification, and location of a piece to be picked or put-away, and the one or more robot processors analyze the sensor signals to generate manipulator arm control signals to guide the end effector of the at least one manipulator arm to pick or put-away the piece.

13. A method of piece picking or piece put-away within a logistics facility, the method comprising:
providing the mobile manipulation robot of claim 1;
generating an itinerary comprising at least one order which includes an identification for at least one piece to be picked or put-away, a location within the logistics facility for the at least one piece to be picked or put-away, and a route for the mobile manipulation robot to take within the logistics facility;
receiving the itinerary at the one or more robot processors;
moving the mobile manipulation robot along the route; and
picking the at least one piece from the location or putting-away the at least one piece to the location.

14. The method of claim 13, wherein moving the mobile manipulation robot occurs autonomously by recognition of at least one landmark by at least one of the plurality of sensors.

15. The method of claim 13, wherein the at least one order is generated by a warehouse management system or a central server.

16. The method of claim 13, further comprising, when picking the at least one item from the location:
placing the at least one item on a storage bed of the mobile manipulation robot; and
sensing a weight for the at least one item placed on the storage bed.

17. A method of piece picking or piece put-away within a logistics facility, the method comprising:
providing the mobile manipulation robot of claim 10;
generating an itinerary comprising at least one order which includes an identification for at least one piece to be picked or put-away, a location within the logistics facility for the at least one piece to be picked or put-away, and a route for the mobile manipulation robot to take within the logistics facility;
receiving the itinerary at the one or more robot processors;
moving the mobile manipulation robot along the route; and
picking the at least one piece from the location or putting-away the at least one piece to the location.

18. The method of claim 17, further comprising:
rotating the at least one manipulator arm to direct the at least one sensor positioned thereon to view a calibration target on the storage bed; and
calibrating the at least one sensor positioned on the at least one manipulator arm.

19. A method of piece picking or piece put-away within a logistics facility, the method comprising:
according the mobile manipulation robot of claim 12;
generating an itinerary comprising at least one order which includes an identification for at least one piece to be picked or put-away, a location within the logistics facility for the at least one piece to be picked or put-away, and a route for the mobile manipulation robot to take within the logistics facility;
receiving the itinerary at the one or more robot processors;
moving the mobile manipulation robot along the route; and
picking the at least one piece from the location or putting-away the at least one piece to the location.

20. The method of claim 19, further comprising:
  raising or lowering the vertical actuator stage of the mobile manipulation robot to position the end effector of the at least one manipulator arm closer to the at least one piece to be picked or put-away.

* * * * *